United States Patent Office 3,510,870
Patented May 5, 1970

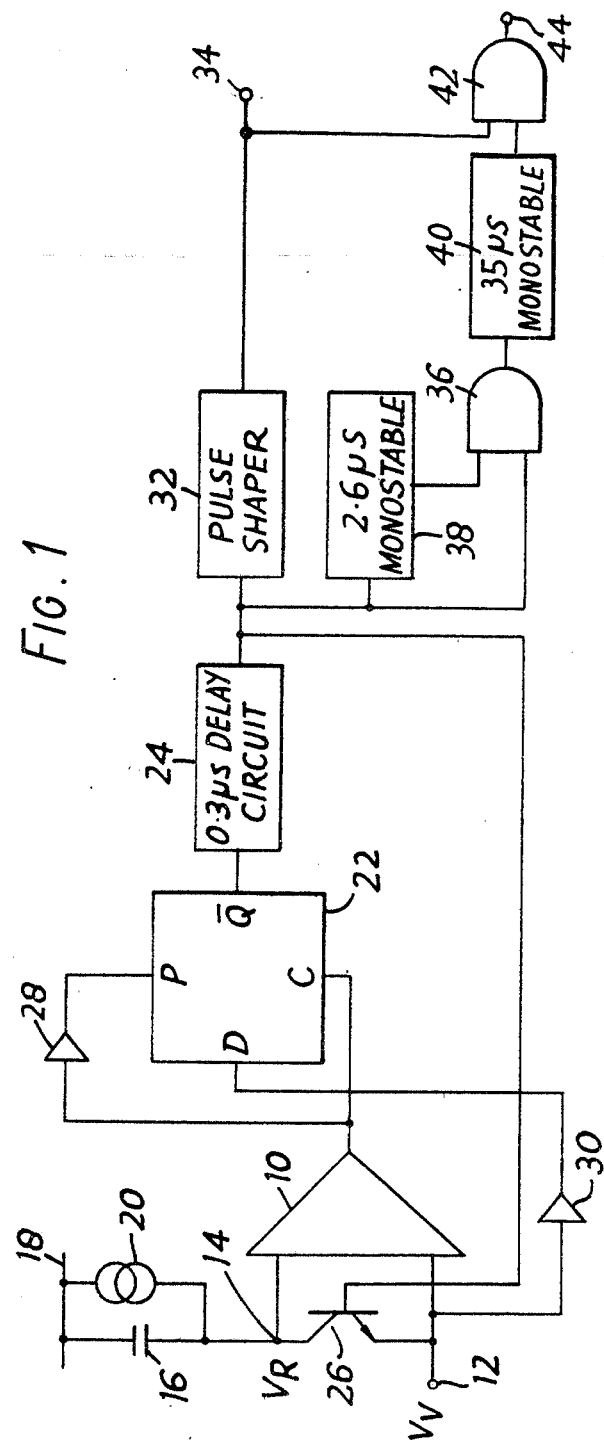

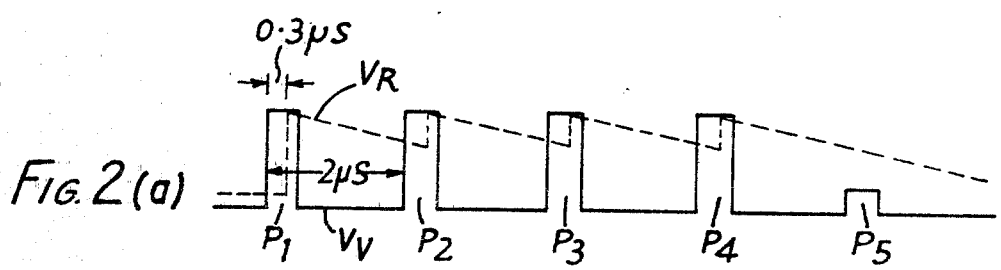
Fig. 2(a)
Fig. 2(b)
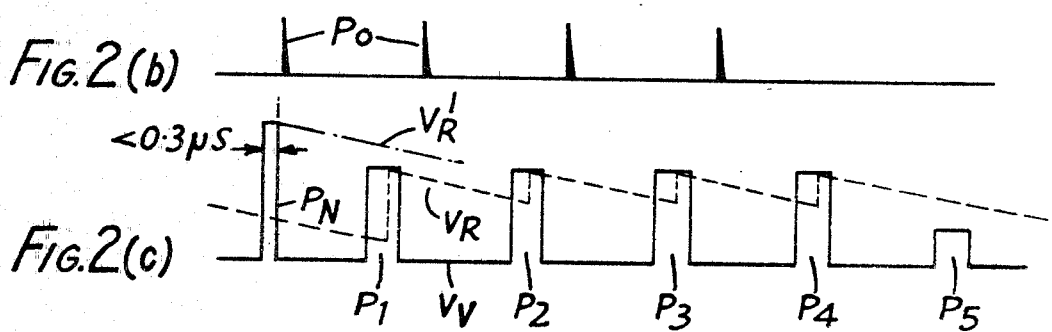
Fig. 2(c)
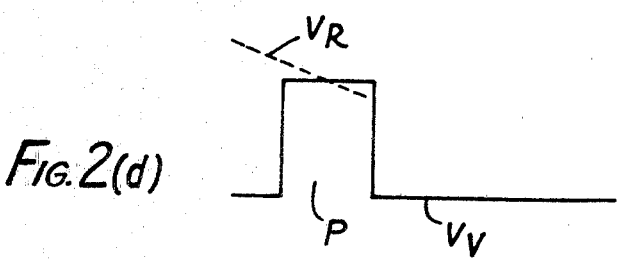
Fig. 2(d)

3,510,870
SECONDARY RADAR TRANSPONDERS
Geoffrey George Woollvin, Harlow, Essex, England, assignor to A. C. Cossor Limited, Harlow, Essex, England
Filed Mar. 14, 1969, Ser. No. 807,241
Int. Cl. G01s 9/56
U.S. Cl. 343—6.8                5 Claims

ABSTRACT OF THE DISCLOSURE

In a secondary radar transponder it is well known to check the relative amplitudes of successive pulses by using the first pulse to charge a capacitor. The decaying potential across the capacitor establishes a reference level with which the next pulse is compared. The improvement according to the invention enables the width of pulses also to be checked. Thus a delay circuit is triggered when the input video level exceeds the reference level and provides an output pulse at the end of its delay period only if the input video level still exceeds the reference level.

---

Figure 3:
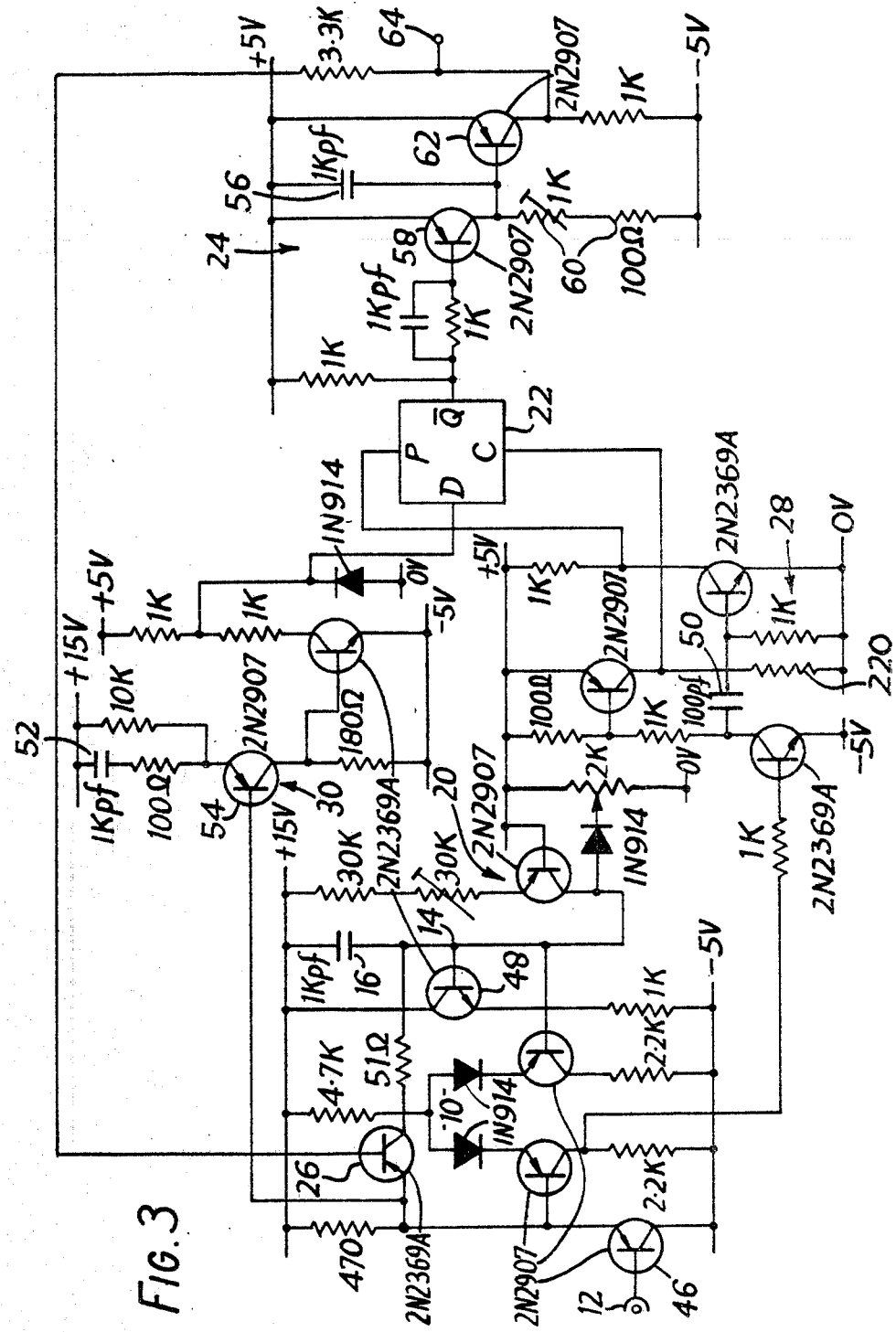

This invention relates to secondary radar systems which are well known in surveillance radar systems used for air traffic control purposes and have the advantages that the return signals are not echoes, and are therefore substantially stronger than the return signals in primary radar systems, and the return signals can be coded to identify the source of each return signal.

A secondary radar system comprises a ground station and a plurality of transponders. The transponders are mounted in the aircraft to be controlled and the ground station transmits interrogating signals to which only the transponders within the small sector covered by the main beam of the directional aerial at the ground station respond to send back return signals.

Each transponder consists essentially of a receiver, a control unit, a modulator and a transmitter. The receiver receives and amplifies the interrogating signals and passes these to the control unit. The control unit has two main functions. The first is to reject received pulses which do not comply with certain conditions and in particular to reject pulses whose characteristics indicate that emanate from a side lobe rather than the main beam of the transmitting antenna at the ground station. The second main function of the control unit is to recognise the group of pulses identifying a particular mode of secondary radar operation, as explained in more detail below.

When the control unit accepts an interrogation signal it causes the modulator to provide the correct return code signal which is transmitted back to the ground station by the transmitter on a frequency different from that of the interrogating signal. In the case of Mode 4 the interrogating signal includes an information code which is passed to a data processing computer which responds to the coded information to determine the return code.

The interrogating signal takes the form of a group of pulses whose number and spacing (i.e. leading edge to leading edge) determine the secondary radar mode being used. In Mode 4 this group is followed by a train of pulses which occupy selected ones of a number of predetermined pulse positions. The combination of pulses actually transmitted in this train constitutes the coded information which is used to ask a particular question. Any aircraft in the main beam then transmits back the appropriate answer.

In the early days of secondary radar only two pulses were utilized, one pulse (control pulse) being transmitted by a non-directional aerial and the other (interrogation pulse) by a directional aerial. If the transponder is on the main beam of the directional aerial the pulse received therefrom will have a similar amplitude to the control pulse from the non-directional aerial. If the transponder is on a side lobe the interrogation pulse will be substantially smaller than the control pulse. It is on this basis that the transponder discriminates between interrogations effected by way of the main beam and interrogations effected by way of a side lobe, and thus effects what is known as side lobe suppression.

For some years now it has been common to operate secondary radar systems with three pulses in the interrogation group. $P_1$ and $P_3$ are interrogation pulses and $P_2$ is the control pulse. On a main lobe $P_1$ and $P_3$ are substantially greater than $P_2$. On a side lobe $P_1$ and $P_3$ are not greater than $P_2$. Whether two or three pulses are employed, particular spacings between pulses in the group is specified for each mode.

More recently military specifications for secondary radar systems have been extended to cover Mode 4 systems in which an initial group identifying the mode consists of four pulses spaced at 2 $\mu$s intervals with a pulse width of 0.5 $\mu$s. These four pulses are followed by a sidelobe suppression pulse.

In a Mode 4 system these five pulses may be followed by as many as 32 additional pulses spaced as close as 2 $\mu$s, these pulses carrying the coded interrogation information.

The present invention particularly concerns the so-called video processing part of the control unit, namely that part which processes the received pulses before they are applied to the group recognition circuits, which determine whether or not the pulses constitute a proper interrogation group in the mode being employed. Such processing in particular involves amplitude discrimination of the pulses for the purpose of effecting side-lobe suppression, and also echo suppression. An echo has a longer propagation path, and hence greater attenuation than, a main path pulse. To enter the system a quick echo would have to exhibit a gain in power over the main path pulse to overcome the desensitization, hereinafter described, caused by the main path pulse.

It is well known to effect such side lobe suppression by using a pulse in a two or three pulse mode to charge a capacitor. The voltage on the capacitor constitutes a reference level, which decays with a suitable time constant, and (depending on the mode in use) it is required that the next pulse shall either be above or be below the reference level, if the interrogation is to be accepted as a main beam interrogation. Although this system is satisfactorily operative on a commercial basis, it suffers from certain defects, mainly concerned with the effects which noise pulses can have. In this connection it must be remembered that secondary radar is used at airfields in conjunction with many other radar, ILS and radio systems and a whole host of pulse signals are present.

One disadvantage of the known system is that the first pulse entering the video processing circuits is labelled as such and consequently a noise pulse immediately preceding a proper interrogation group can cause the interrogation to be rejected because the noise pulse and the first interrogation pulse are labelled as pulses 1 and 2 of the interrogation group. Another disadvantage is that the known systems possess no means of discriminating against short pulses. Although such pulses will eventually be rejected by the transponder, they can penetrate the circuits to such an extent as to cause the duty cycles of certain components to be exceeded. For these and related reasons it is clear that the known system does not discriminate against noise pulses in the most efficient way.

The object of this invention is to provide an improved video processing circuit which effects both amplitude and pulse width discrimination and which is suitable for use with all secondary radar modes known at present.

According to the invention there is provided a video processing circuit in the control unit of a secondary radar transponder, comprising a capacitor for storing a reference potential which decays with a predetermined time constant, means for comparing an input video waveform with the reference potential to provide a signal indicating when the video waveform exceeds the reference potential, and a delay circuit responsive to the comparing means to provide an output pulse to subsequent stages of the control unit and simultaneously to change the reference potential substantially to the then existing magnitude of the video waveform, thereby to terminate the said signal, the delay circuit being arranged to provide the output pulse a predetermined interval of time after the commencement of the said signal and then only if the said signal still exists.

The invention will be described in more detail, by way of example, with reference to the accompanying drawings, in which:

FIG. 1 is a block diagram of part of a secondary radar transponder control unit, FIGS. 2a–2d show explanatory waveforms, and FIG. 3 is a full circuit diagram of part of FIG. 1.

In FIG. 1 a differential amplifier 10 compares the video input signal on a first input terminal 12 with a reference voltage on a second input terminal 14. The video signal is provided in known manner by the transponder receiver. The reference voltage is provided by a capacitor 16 connected between the terminal 14 and a fixed voltage rail 18. A constant current discharge path 20 provides for decay of the reference voltage with a suitable time constant.

The output of the differential amplifier is connected to the clock input C of a D-type flip-flop 22 whose $\bar{Q}$ output is connected to an 0.3 $\mu$s delay circuit 24 of a special nature. The function of the flip-flop 22 will be explained below; for the present it will be assumed that the delay circuit 24 is set when the output of the differential amplifier 10 switches to the state corresponding to the video level ($V_V$) exceeding the reference level ($V_R$). The delay circuit 24 is so constructed that it provides an output pulse only at the end of its 0.3 $\mu$s delay period only if the setting input from the flip-flop 22 is still present. Accordingly the circuit discriminates against short pulses (<0.3 $\mu$s) which produce no output from the delay circuit 24.

When the delay circuit produces its output pulse, a transistor switch 26 connected across the inputs 12 and 14 of the differential amplifier 10 is driven hard on and shorts together the two inputs. Accordingly $V_R$ becomes established at the current value of $V_V$ and the output of the differential amplifier reverts to the quiescent state corresponding to $V_R > V_V$. The output of the differential amplifier is connected through a differentiating amplifier 28 to the presetting input P of the flip-flop 22 to preset the flip-flop to the state $\bar{Q} = 0$.

The situation during reception of proper pulses is illustrated in FIG. 2a, $V_R$ and $V_V$ being plotted in broken and full lines respectively. Mode 4 is selected for purposes of explanation. Initially the circuit has maximum sensitivity with $V_R$ at its datum value (i.e. the capacitor 16 completely discharged). The first received pulse $P_1$ therefore sets the flip-flop 22 (as later described) to $\bar{Q} = 1$, so setting the delay circuit 24. 0.3 $\mu$s later, $P_1$ still being present, the delay circuit 24 produces an output pulse which causes $V_R$ to rise to $V_V$ in the manner described, switching the flip-flop 22 back to $\bar{Q} = 0$ and terminating the pulse from the delay circuit 24, this pulse being shown as $P_0$ in FIG. 2b.

The circuit is now desensitized but the next pulse $P_2$ can still institute the same sequence of operations and cause another pulse $P_0$ to be generated because $V_R$ has decayed sufficiently by the time $P_2$ arrives. Similarly $P_3$ and $P_4$ produce further pulses $P_0$.

Assume now that $P_1$ to $P_4$ are main beam directional pulses and are followed by an omnidirectional pulse $P_5$, which is therefore of much smaller amplitude than $P_1$ to $P_4$. $P_5$ remains below $V_R$ and therefore no pulse $P_0$ is produced. A group of 4 correctly spaced interrogation pulses (reconstituted as described below) is therefore passed to the circuits which recognise this group and which may be as described in the specification of our Great Britain application No. 13747/68.

If, in contrast, the interrogation were made via a side-lobe, $P_1$ to $P_5$ would all be of comparable amplitude and a group of 5 pulses $P_0$ would be passed to the recognition circuits. These circuits or the computer utilized in Mode 4 transponders can readily be arranged to detect the presence of the fifth pulse and accordingly reject the interrogation, because it emanates from a side lobe.

Consider now the situation illustrated in FIG. 2c in which the correct group $P_1$ to $P_5$ happens to be preceded by a strong noise pulse $P_N$ which is of short duration however. In the known system described above, this would have raised $V_R$ to the level $V_R'$ shown in chain dotted lines, which would strongly desensitise the circuit and lead to the rejection of $P_1$ because $V_V$ is less than $V_R'$. In accordance with the present invention $P_N$ never generates a pulse $P_0$ and does not therefore lead to desensitisation, because $P_N$ is less than 0.3 $\mu$s wide and the delay circuit 24 never produces its output. $V_R$ continues unaffected and $P_1$ is not rejected.

FIG. 2d illustrates an anomalous situation which could occur when $V_V$ is less than $V_R$ at the leading edge of a pulse P of an intermediate amplitude. Nevertheless, as shown, $V_R$ can decay during the pulse P sufficiently to cause the differential amplifier 10 to switch its state. It is desired however to eliminate such pulses of intermediate amplitude (which would lead, it will be noted, to $P_0$ pulses exhibiting a variable time shift relative to the $P_0$ pulses produced at the leading edge of video pulses. This function is performed by the flip-flop 22 which it will be recalled receives the output of the differential amplifier 10 on its clock input C and therefore only switches to $\bar{Q} = 1$ if its data input D is in receipt of a 0. The data input D is connected to the output of a differentiating amplifier 30 whose input is coupled to the video input 12. Normally the output of the amplifier 30 is at level 1 and a short pulse at level 0 is produced only at the leading edge of each video pulse. Accordingly the flip-flop 22 is set to $\bar{Q} = 1$ only when the output of the differential amplifier switches substantially simultaneously with the rising edge of a video pulse.

The pulses $P_0$ provided by the delay circuit 24 are shaped by a pulse shaper 32 which reconstitutes 0.5 $\mu$s pulses for mode 4 and 0.8 $\mu$s pulses for other modes. For mode 4 the reconstituted pulses are simply passed to a terminal 34, which is connected to the group recognition circuits. As indicated above, side-lobe suppression for mode 4 is effected further on in the circuitry by detection of the fifth pulse. For other three pulse modes, if on a main beam, only $P_1$ and $P_3$ will get through the circuit as $P_0$ pulses. If however interrogation takes place on a side-lobe, $P_1$, $P_2$ and $P_3$ will all get through and $P_1$ and $P_2$ occur close together. This condition is detected by gating the output of the delay circuit 24 in a gate 36 with the output delay 2.6 $\mu$s by a monostable circuit 38. If the output and the delayed output occur together, the output of the gate 36 sets a 35 $\mu$s suppression monostable 40, which then puts an inhibiting input on a gate 42, which cannot therefore pass the reconstituted pulses from the pulse shaper 32 to an output terminal 44, to which the recognition circuits for modes other than mode 4 are connected. So long as the monostable 40 is not set, all pulses provided by the shaper 32 pass to the terminal 44.

The part of the circuit with which the present invention is concerned is the part preceding the pulse shaper 32 and accordingly this part only is shown in FIG. 3. FIG. 3 will not be described in detail as it is a complete circuit diagram and the parts thereof are identified with the same references as in FIG. 1. The following points are noted however.

True signals are negative relative to false signals and the video signal on terminal 12 must be applied in inverted form. The differential amplifier 10 comprises a long-tail pair with driver transistors 46 and 48 which are oppositely arranged in grounded emitter and grounded collector configuration respectively so that their collector-emitter voltage drops add, instead of cancelling, when the transistor 26 shorts the emitter of the transistor 46 to the terminal 14. This drives the amplifier 10 positively to the quiescent state, in spite of the fact that $V_R = V_V$ at this stage.

The constant current discharge path 20 is provided by a conventional transistor circuit. The differentiating amplifier 28 includes a differentiating capacitor 50 and the differentiating amplifier 30 includes a differentiating capacitor 52 which is connected in series with the emitter of a transistor 54 so that only the leading edges of the video pulses are differentiated.

The special delay circuit 24 comprises a time-constant capacitor 56 which is normally kept discharged by a conductive transistor 58, driven conductive by the output $\overline{Q}=0$ of the flip-flop 22. When the flip-flop 22 switches to $\overline{Q}=1$, the transistor 58 is cut off and the capacitor 56 charges through resistors 60 until the base of a further transistor 62 becomes sufficiently negative to cause the further transistor to conduct and generate a pulse $P_0$ on terminal 64. The time constant of the capacitor 56 and resistors 60 is so adjusted that the pulse $P_0$ occurs 0.3 µs after the flip-flop switches to $\overline{Q}=1$.

If the flip-flop 22 switches back to $\overline{Q}=0$ before the 0.3 µs delay has elapsed (because the video pulse was a short noise pulse) the pulse $P_0$ is never emitted because the transistor 58 immediately begins to conduct and discharges the capacitor 56 again.

I claim:

1. A video processing circuit in the control unit of a secondary radar transponder, comprising a capacitor for storing a reference potential which decays with a predetermined time constant, means for comparing an input video waveform with the reference potential to provide a signal indicating when the video waveform exceeds the reference potential, and the improvement consisting in a delay circuit responsive to the comparing means to provide an output pulse for utilization in subsequent stages of the control unit and means responsive to the delay circuit simultaneously to change the reference potential substantially to the then existing magnitude of the video waveform, thereby to terminate the said signal, the delay circuit being constructed and arranged to provide the output pulse a predetermined interval of time after the commencement of the said signal and then only if the said signal still exists.

2. A circuit according to claim 1, wherein the delay circuit comprises a further capacitor, a charging impedance for the capacitor, a switch operative to discharge the further capacitor in the absence of the said signal but to allow the capacitor to charge through the charging impedance in the presence of the said signal, and a circuit connected to the further capacitor to provide an output pulse when the potential thereacross attains a predetermined value.

3. A circuit according to claim 1, further comprising a bistable flip-flop which provides the said signal when the flip-flop is in a set state, the flip-flop being coupled to the comparing means so as to be reset whenever the video waveform reduces to substantially the reference level and being further coupled to the comparing means and to means for differentiating the video waveform so as to be set only when the video waveform exceeds the reference level simultaneously with the leading edge of a pulse in the video waveform.

4. A circuit according to claim 1, wherein the comparing means comprises a differential amplifier having one input connected to receive the video waveform and a second input connected to one plate of the first said capacitor, the other plate of which is connected to a point at fixed potential, a high impedance discharge path connected across the capacitor and a normally high-impedance switch connected across the said first and second inputs and responsive to the said output pulse to short these inputs together.

5. A circuit according to claim 4, wherein the differential amplifier is asymmetrically biased so as to switch positively to the quiescent state (in which the said signal is not provided) when the reference potential equals the magnitude of the video waveform.

References Cited

UNITED STATES PATENTS

| | | | |
|---|---|---|---|
| 2,910,579 | 10/1959 | Jones et al. | 343—6.8 |
| 3,032,757 | 5/1962 | Majerus et al. | 343—6.8 |
| 3,167,772 | 1/1965 | Bagnall et al. | 343—6.5 X |
| 3,375,514 | 3/1968 | LeGrand | 343—6.5 |

RODNEY D. BENNETT, Primary Examiner

M. F. HUBLER, Assistant Examiner